UNITED STATES PATENT OFFICE.

ADOLF BRÄUER, OF GRÜNAU, NEAR BERLIN, GERMANY, ASSIGNOR TO CHEMISCHE FABRIK GRÜNAU LANDSHOFF & MEYER AKTIENGESELLSCHAFT, OF GRÜNAU, GERMANY.

PROCESS FOR DISTILLING ACETIC ACID AND THE LIKE.

1,196,329.      Specification of Letters Patent.      Patented Aug. 29, 1916.

No Drawing.      Application filed March 28, 1916.      Serial No. 87,161.

*To all whom it may concern:*

Be it known that I, ADOLF BRÄUER, a subject of the Emperor of Austria-Hungary, and residing at Grünau, near Berlin, Germany, have invented certain new and useful Improvements in Processes for Distilling Acetic Acid and the like, of which the following is a specification.

My application for U. S. Patent Ser. No. 53634 and filed October 1, 1915, which became Patent No. 1,174,663 dated March 7, 1916, relates to the distillation of formic acid by applying a thin mixture of a formate and sulfuric acid to a rotating evaporating surface, whereby the vapors of formic acid liberated are collected and condensed, while the solid residue from the evaporating surface is removed by scraping off.

I have now found that the process as proposed by me for the distillation of formic acid is even better suited for the continuous distillation of acetic acid, because all the processes of distilling acetic acid by a continuous method have more or less failed. In practice it is found that in the stills, as regularly used for the distillation of acetic acid, considerable quantities of calcium sulfate accumulate which are produced by the decomposition of calcium acetate with sulfuric acid. It is impossible to remove those quantities of calcium sulfate in the regular process of distillation and since the calcium sulfate forms a thick and nearly solid mass, when it is converted into hydrated gypsum the difficulties of distilling are very much increased, because the agitator used in the still is gradually stopped and its arms are broken off on account of the impossibility of stirring the thick mass. Apart from that, the removal of the gypsum from the still is a most unpleasant operation which is very dangerous to the health of the workmen, because of the acid vapors which are always contained in the gypsum. Although many methods have been proposed for distilling acetic acid in a continuous process, all those methods are in practice intermittent for the reasons just stated. By my invention all those drawbacks and difficulties are removed and the distillation can be carried out without interruption and in a continuous manner. Since the mixture of calcium acetate and sulfuric acid is somewhat thickish and does not flow as well as could be desired I add some acetic acid to that mixture in such a quantity that the mixture will readily stick to a rotated drum or the like. I then apply that mixture in a thin layer on a rotatable heated plate or a heated body of round shape, for instance a rotating roller or drum. By the heat the vapors of acetic acid are driven off and collected or rather condensed, while the sulfate remaining on the heated surface is at once scraped off, so as to offer a fresh heating surface to the mixture to be distilled. The vapors of acetic acid are drawn off by means of a fan or the like and driven to the condensing apparatus.

The heated surfaces can be made of iron and it was much surprising that vapors of acids which so strongly attack iron like acetic acid can be distilled in an iron apparatus. That is most likely due to the fact that the acetic acid forms small balls on the heated iron surface which are wrapped up in an atmosphere of acetic acid vapor in the manner described by Leydenfrost and termed the "Leydenfrost phenomenon" so that the liquid acetic acid does not come in contact with the iron surface.

The apparatus used is practically the same as described in my Patent No. 1,174,663 above noted.

It will be understood that the same process may also be used for the distillation of other acids from products of reaction which have similar physical properties as calcium sulfate and which by accumulating in the still cause great inconvenience when the contents of the still requires agitation during the distillation.

What I claim is:—

1. A process for distilling acetic acid, consisting in covering a heated rotating surface evaporator with a mixture of an acetate and sulfuric acid in a thin layer, whereupon the solid residue is scraped off after the liberation of the acetic acid vapors and the evaporation of the mass has taken place, before a new supply of the mixture is brought onto the surface of the rotating evaporator, substantially as described.

2. A process for distilling acetic acid, consisting in covering a heated drum with a mixture of an acetate and sulfuric acid in a thin layer, whereupon the solid residue is scraped off after the liberation of the acetic acid vapors and the evaporation of the mass has taken place, before a new supply of the mixture is brought onto the surface of the rotating evaporator, substantially as described.

3. The herein described process of distilling acetic acid, which consists in applying a thin layer of a mixture of an acetate and sulfuric acid to an evaporating surface, driving off the acetic acid vapors by heat and removing the solid residue from the evaporating surface.

In testimony whereof I affix my signature in presence of two witnesses.

ADOLF BRÄUER.

Witnesses:
HENRY HASPER,
ALLEN F. JENNINGS.